United States Patent
Arinipalli et al.

(10) Patent No.: US 12,523,158 B2
(45) Date of Patent: Jan. 13, 2026

(54) SEALING DEVICE AND FLOW MACHINE WITH THE SEALING DEVICE

(71) Applicant: Siemens Energy Global GmbH & Co. KG, Bayern (DE)

(72) Inventors: Ranjith Kumar Arinipalli, Finspång (SE); Adrian Pauli, Vinninga (SE); Urban Karlsson, Finspång (SE)

(73) Assignee: Siemens Energy Global GmbH & Co. KG, Bayern (DE)

( * ) Notice: Subject to any disclaimer, the term of this patent is extended or adjusted under 35 U.S.C. 154(b) by 173 days.

(21) Appl. No.: 18/682,902

(22) PCT Filed: Jul. 29, 2022

(86) PCT No.: PCT/EP2022/071438
§ 371 (c)(1),
(2) Date: Feb. 10, 2024

(87) PCT Pub. No.: WO2023/025520
PCT Pub. Date: Mar. 2, 2023

(65) Prior Publication Data
US 2025/0137384 A1    May 1, 2025

(30) Foreign Application Priority Data
Aug. 24, 2021  (EP) .................................... 21192697

(51) Int. Cl.
*F01D 11/00*   (2006.01)

(52) U.S. Cl.
CPC ........ *F01D 11/005* (2013.01); *F05D 2240/57* (2013.01)

(58) Field of Classification Search
CPC ..... F01D 11/005; F01D 11/00; F05D 2240/57
See application file for complete search history.

(56) References Cited

U.S. PATENT DOCUMENTS 5,118,120 A * 6/1992 Drerup .................. F16J 15/021
                                                   415/173.7
6,464,232 B1 * 10/2002 Marchi ................ F01D 11/005
                                                   415/173.1
(Continued)

FOREIGN PATENT DOCUMENTS

EP    1270875 A2    1/2003
EP    2530250 A2    12/2012
(Continued)

OTHER PUBLICATIONS

PCT International Search Report and Written Opinion of International Searching Authority mailed Sep. 15, 2022 corresponding to PCT International Application No. PCT/EP2022/071438 filed Jul. 29, 2022.

*Primary Examiner* — Michael L Sehn
(74) *Attorney, Agent, or Firm* — Wolter Van Dyke Davis, PLLC

(57) ABSTRACT

A sealing device for a flow machine, wherein the sealing device has a flap seal, a surface, a first protrusion protruding from the surface, a second protrusion protruding from the surface and a biasing member that is supported on the first protrusion and the second protrusion and is adapted to push the flap seal away from the first protrusion and the second protrusion in a direction transversal to the normal of the surface. The biasing member has a foot that protrudes from a first region of the biasing member in a direction towards the surface, wherein the first region is arranged immediately neighbored to the foot, wherein the foot contacts the surface and biases the remaining biasing member in a direction away from the first protrusion and the second protrusion.

14 Claims, 1 Drawing Sheet

(56) References Cited

U.S. PATENT DOCUMENTS

| | | | |
|---|---|---|---|
| 6,464,457 B1 | 10/2002 | Morgan | |
| 10,240,474 B2 * | 3/2019 | Feldmann | ................. F01D 9/02 |
| 2009/0169370 A1 | 7/2009 | Morgan | |
| 2012/0308368 A1 | 12/2012 | Helvaci | |
| 2020/0355087 A1 | 11/2020 | Moreau | |
| 2020/0400030 A1 | 12/2020 | Mei | |

FOREIGN PATENT DOCUMENTS

| | | |
|---|---|---|
| EP | 3736413 A1 | 11/2020 |
| WO | 2019174788 A1 | 9/2019 |

* cited by examiner

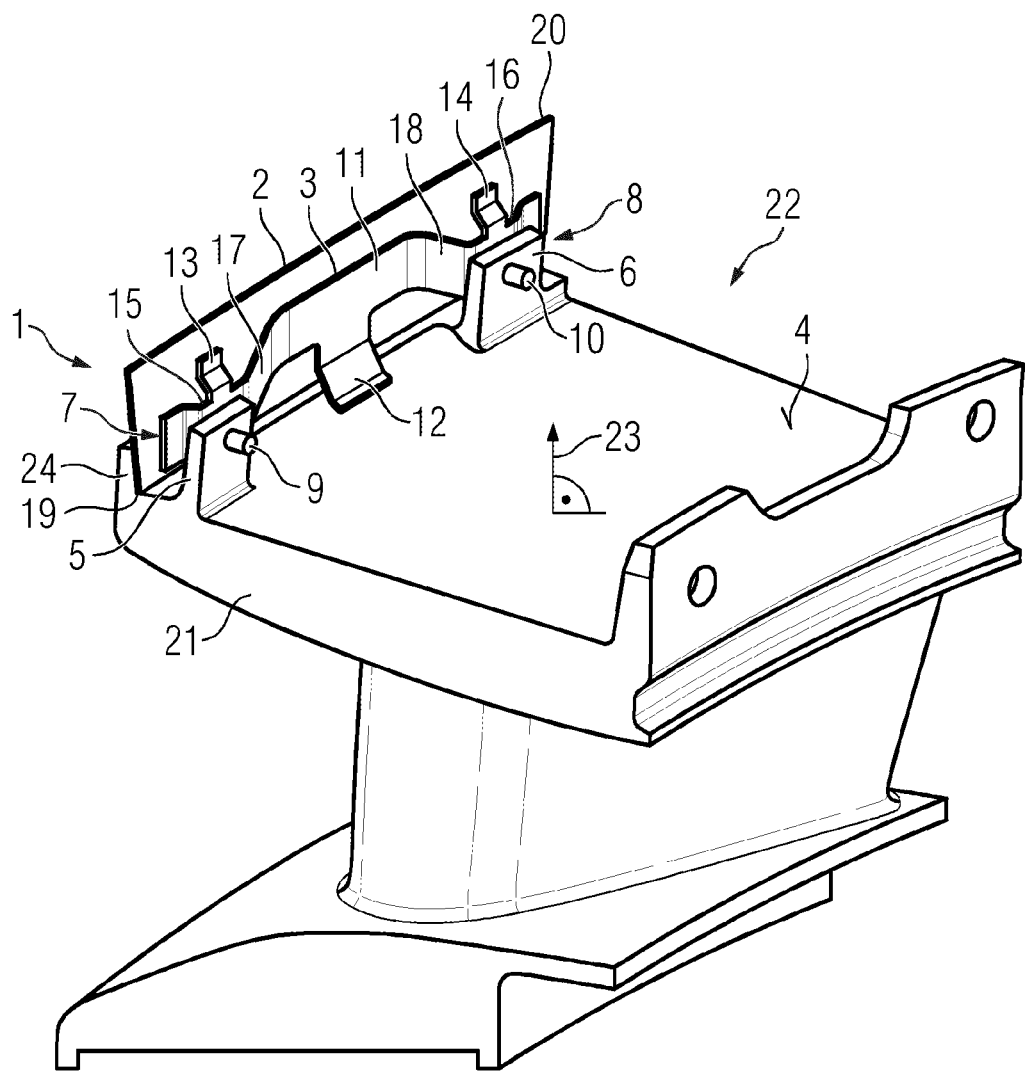

SEALING DEVICE AND FLOW MACHINE WITH THE SEALING DEVICE

CROSS REFERENCE TO RELATED APPLICATIONS

This application is the US National Stage of International Application No. PCT/EP2022/071438 filed 29 Jul. 2022, and claims the benefit thereof, which is incorporated by reference herein in its entirety. The International Application claims the benefit of European Application No. EP21192697 filed 24 Aug. 2021.

FIELD OF INVENTION

The invention relates to a sealing device and flow machine with the sealing device.

BACKGROUND OF INVENTION

Flap seals are conventionally provided for sealing gaps, in particular in a flow machine. The sealing of the gaps in a flow machine reduces a leakage within the flow machine and therefore leads to an increased efficiency of the flow machine. Flap seals are conventionally pushed by a spring against the gap for which the spring has to be supported. In order to support the springs, space consuming structures have to be provided.

For example it is known from U.S. 2009/0169370 A1, to seal gaps between a turbine nozzle and adjacent flow boundary parts by a leaf seal assembly comprising besides the leaf seal a coil spring, finger springs or the like for pressing the leaf seal against an appropriate sealing surface. A U-shaped spring design for a similar arrangement is disclosed in U.S. Pat. No. 5,118,120 and EP 1 270 875 A2. Further sealing designs are disclosed EP 3 736 413 A1 and WO 2019/174788.

The space-consuming structures lead to increased costs and less available space.

SUMMARY OF INVENTION

Therefore, it is an object of the invention to provide a sealing device for a flow machine and the flow machine with the sealing device, wherein the sealing device requires only a small amount of space.

The inventive sealing device for a flow machine comprises a flap seal, a surface, a first protrusion protruding from the surface, a second protrusion protruding from the surface and a biasing means that is supported on the first protrusion and the second protrusion and is adapted to push the flap seal away from the first protrusion and the second protrusion in a direction transversal to the normal of the surface, wherein the biasing means comprises a foot that protrudes from a first region of the biasing means in a direction towards the surface, wherein the first region is arranged immediately neighboured to the foot, wherein the foot contacts the surface and biases the remaining biasing means in a direction away from the first protrusion and the second protrusion.

By providing the foot that contacts the surface, the remaining biasing means, in particular the first region, is biased in a direction away from the first protrusion and the second protrusion. It is therefore not required to provide a spring at a distance from the surface in which the first region is arranged. The spring would have to be supported by the first protrusion and/or the second protrusion. The first protrusion and/or the second protrusion therefore do not need to be formed so high that they reach the distance of the first region from the surface but can advantageously be formed lower. Thereby, the first protrusion and the second protrusion can be formed such that they only need a small amount of space. This results therein that the sealing device can be made cost efficient.

For biasing the biasing means the foot can be under a mechanical tension. The mechanical tension can increase if the first region is displaced towards the first protrusion and the second protrusion and the mechanical tension can decrease if the first region is displaced away from the first protrusion and the second protrusion.

It is preferred that the biasing means comprises a contacting part that contacts the flap seal and is arranged between the first protrusion and the second protrusion. It is in particular preferred that the contacting part comprises the first region.

The foot preferably has a curved shape, wherein the foot is adapted to become less curved when the contacting part is displaced away from the first protrusion and the second protrusion.

It is preferred that the biasing means comprises a first arm that protrudes from a second region of the biasing means in a direction away from the surface, contacts the flap seal and is arranged at a distance from the contacting part, wherein the second region is arranged immediately neighboured to the first arm. The flap seal is thereby supported by the biasing means on more than one location which increases the sealing performance of the flap seal.

The biasing means preferably comprises a second arm that protrudes from a third region of the biasing means in a direction away from the surface, contacts the flap seal and is arranged at a distance from the contacting part, wherein the third region is arranged immediately neighboured to the second arm and the contacting part is arranged between the first arm and the second arm. By providing the second arm, the sealing performance of the flap seal can be further increased.

It is preferred that the flap seal has a lower end facing towards the surface and an upper end facing away from the surface, wherein the contacting part contacts the flap seal in a middle between the lower end and the upper end. It was surprisingly found that a wear of the flap seal can be minimized if the biasing means contacts the flap seal in the middle. It is particularly preferred that the lower end and the upper end are parallel to each other and in particular parallel to the surface. It is also preferred that the first arm and the second arm contact the flap seal in the middle, whereby wear of the flap seal can be further reduced.

The sealing device is preferably adapted such that the flap seal can tilt around the lower end.

It is preferred that the sealing device comprises a third protrusion that protrudes away from the surface, is arranged on a side of the flap seal and contacts the flap seal, wherein the side of the flap seal faces away from the first protrusion and the second protrusion. The lower end can for example be arranged in a corner that is formed by the surface and the third protrusion. By doing so, it is possible that the flap seal can tilt around the lower end.

The sealing device preferably comprises a first bearing that is adapted to support the biasing means such that the biasing means can tilt with respect to the first protrusion, wherein the sealing device preferably comprises a second bearing that is adapted to support the biasing means such that the biasing means can tilt with respect to the second protrusion. The first bearing and/or the second bearing are preferably arranged at a distance from the surface, wherein the distance is shorter than the distance from the surface to the middle of the flap. An upper end of the first bearing and/or the second bearing is particularly preferred arranged at the distance from the surface, wherein the upper end is facing away from the surface.

The flow machine according to the invention comprises the sealing device. The flow machine can for example be a steam turbine or a gas turbine. The sealing device can for example be arranged in a compressor section and/or a turbine section of the gas turbine.

It is preferred that the surface is formed by a blade root of a blade of the flow machine. The blade can for example be a guiding vane of the compressor section, a rotating blade of the compressor section, a guiding vane of the turbine section or a rotating blade of the turbine section. The blade can for example also be a guiding vane of a steam turbine or a rotating blade of a steam turbine.

BRIEF DESCRIPTION OF THE DRAWINGS

In the following, the invention is explained on the basis of a schematic drawing.

The FIGURE shows a perspective view of a vane with the sealing device.

DETAILED DESCRIPTION OF INVENTION

As it can be seen from the FIGURE, a sealing device 1 for a flow machine comprises a flap seal 2, a surface 4, a first protrusion 5 protruding from the surface 4, a second protrusion 6 protruding from the surface 4 and a biasing means 3. The first protrusion 5 and the second protrusion 6 are arranged at a distance to each other. The biasing means 3 is supported on the first protrusion 5 and the second protrusion 6 and is adapted to push the flap seal 2 away from the first protrusion 5 and the second protrusion 6 in a direction transversal to the normal 23 of the surface 4. The biasing means 3 comprises a foot 12 that protrudes from a first region of the biasing means 3 in a direction towards the surface 4, wherein the first region is arranged immediately neighboured to the foot 12, wherein the foot 12 contacts the surface 4 and biases the remaining biasing means 3 in a direction away from the first protrusion 5 and the second protrusion 6.

The flap seal 2 can have the shape of a plate, wherein the largest surface or one of the largest surfaces of the plate can be in particular rectangular, see the FIGURE. An angle between the largest surface or one of the largest surfaces of the plate and the normal 23 can for example be from 0° to 20°, in particular from 0° to 10°. The flap seal 2 can have a lower end 19 facing towards the surface 4 and an upper end 20 facing away from the surface 4. The lower end 19 and the upper end 20 can be parallel to each other. In addition, the lower end 19 and the upper end 20 can be parallel to the surface 4.

The FIGURE shows that the sealing device 1 can comprise a third protrusion 24 that protrudes in a direction away from the surface 4, is arranged on a side of the flap seal 2 and contacts the flap seal 2, wherein the side of the flap seal 2 faces away from the first protrusion 5 and the second protrusion 6. The biasing means 3 is thereby adapted to push the flap seal 2 against the third protrusion 24. The third protrusion 24 can protrude from the surface 4, as shown in the FIGURE, or can protrude from a part of the sealing device 1, wherein the part is different from the surface 4.

The sealing device 1 can comprise a first bearing 7 that is adapted to support the biasing means 3 such that the biasing means 3 can tilt with respect to the first protrusion 5. The sealing device 1 can furthermore comprise a second bearing 8 that is adapted to support the biasing means 3 such that the biasing means 3 can tilt with respect to the second protrusion 6. In the case that the biasing means 3 pushes the flap seal 2 against the third protrusion 24 and the lower end 19 is arranged in a corner formed by the third protrusion 24 and the surface 4, the sealing device 4 is adapted such that the flap seal 2 can tilt around the lower end 19.

The first bearing 7 can be formed by a first bearing part 15 of the biasing means 3 and a first rod 9 that extends through a through hole in the first protrusion 5 and a through hole in the first bearing part 15. A clearance between the first rod 9 and an edge of the through hole in the first bearing part 15 can be dimensioned such that the biasing means 3 can tilt with respect to the first protrusion 5. The first rod 9 can be fixedly attached to the first protrusion 5. Furthermore, the first rod 9 can comprise a head (not shown) having a larger diameter than a part of the first rod 9, wherein the part of the first rod 9 is arranged immediately neighboured to the head, so that the first bearing part 15 is confined between the head of the first rod 9 and the first protrusion 5. Analogously, the second bearing 8 can be formed by a second bearing part 16 of the biasing means 3 and a second rod 10 that extends through a through hole in the second protrusion 6 and a through hole in the second bearing part 16. A clearance between the second rod 10 and an edge of the through hole in the second bearing part 16 can be dimensioned such that the biasing means 3 can tilt with respect to the second protrusion 6. The second rod 10 can be fixedly attached to the second protrusion 6. Furthermore, the second rod 10 can comprise a head (not shown) having a larger diameter than a part of the second rod 10, wherein the part of the second rod 10 is arranged immediately neighboured to the head, so that the second bearing part 16 is confined between the head of the second rod 10 and the second protrusion 6.

FIG. 1 show that the biasing means 3 can comprise a contacting part 11 that contacts the flap seal 2 and is arranged between the first protrusion 5 and the second protrusion 6. The contacting part 11 can comprise the first region. The contacting part 11 can for example contact the largest or one of the largest surfaces of the flap seal 2. The biasing means 3 can comprise a first connecting arm 17 that is attached on a first end of the contacting part 11 and a second connecting arm 18 that is attached on a second end of the contacting part 11, wherein the second end is facing away from the first end. The first connecting arm 17 connects the contacting part 11 to the first bearing part 15 and the second connecting arm 18 connects the contacting part 11 to the second bearing part 16. A respective angle can be formed by the first bearing part 15 and the first connecting arm 17, by the first connecting arm 17 and the contacting part 11, by the contacting part 11 and the second connecting arm 18 and by the second connecting arm 18 and the second bearing part 16.

The foot 12 can have a curved shape, see the FIGURE, wherein the foot 12 is adapted to become less curved when the contacting part 11 is displaced away from the first protrusion 5 and the second protrusion 6. The foot 12 can be under a mechanical tension that becomes weaker when the contacting part 11 is displaced away from the first protrusion 5 and the second protrusion 6.

As it can be seen from the FIGURE, the biasing means 3 can comprise a first arm 13 that protrudes from a second region of the biasing means 3 in a direction away from the surface 4, contacts the flap seal 2 and is arranged at a distance from the contacting part 11, wherein the second region is arranged immediately neighboured to the first arm 13. The second region can comprise the first bearing part 15. The biasing means 3 can comprise a second arm 14 that protrudes from a third region of the biasing means 3 in a direction away from the surface 4, contacts the flap seal 2 and is arranged at a distance from the contacting part 11, wherein the third region is arranged immediately neighboured to the second arm 14 and the contacting part 11 is arranged in a direction from the first protrusion 5 to the second protrusion 6 between the first arm 13 and the second arm 14. The third region can comprise the second bearing part 16.

The contacting part 11, the first arm 13 and/or the second arm 14 can contact the flap seal 2 in a middle between the lower end 19 and the upper end 20, see the FIGURE. The first rod 9, in particular the complete first rod 9, can be arranged in the direction of the normal 23 between the middle and the surface 4. The second rod 10, in particular the complete second rod 10, can be arranged in the direction of the normal 23 between the middle and the surface 4.

The FIGURE shows that the sealing part 1 can be part of a flow machine. The middle of the flap seal 2, wherein the middle is contacted by the contacting part 11, can be arranged in a middle between the lower end 19 and the upper end 20 in a radial direction of the flow machine.

The surface 4 can be formed by a blade root 21 of the flow machine. The flow machine can be a gas turbine or a steam turbine. The blade can be a guiding vane 22 or a rotating blade of a compressor section or turbine section of the gas turbine. The blade also be a guiding vane 22 or a rotating blade of the steam turbine.

The invention claimed is:

1. A sealing device for a flow machine, comprising:
a flap seal,
a surface,
a first protrusion protruding from the surface,
a second protrusion protruding from the surface, and
a biasing means that is supported on the first protrusion and the second protrusion and is adapted to push the flap seal away from the first protrusion and the second protrusion in a direction transversal to the normal of the surface,
wherein the biasing means comprises a foot that protrudes from a first region of the biasing means in a direction towards the surface, wherein the first region is arranged immediately neighboured to the foot, wherein the foot contacts the surface and biases the remaining biasing means in a direction away from the first protrusion and the second protrusion.

2. The sealing device according to claim 1,
wherein the biasing means comprises a contacting part that contacts the flap seal and is arranged between the first protrusion and the second protrusion.

3. The sealing device according to claim 2,
wherein the contacting part comprises the first region.

4. The sealing device according to claim 2,
wherein the foot has a curved shape, wherein the foot is adapted to become less curved when the contacting part is displaced away from the first protrusion and the second protrusion.

5. The sealing device according to claim 2,
wherein the biasing means comprises a first arm that protrudes from a second region of the biasing means in a direction away from the surface, contacts the flap seal and is arranged at a distance from the contacting part, wherein the second region is arranged immediately neighboured to the first arm.

6. The sealing device according to claim 5,
wherein the biasing means comprises a second arm that protrudes from a third region of the biasing means in a direction away from the surface, contacts the flap seal and is arranged at a distance from the contacting part, wherein the third region is arranged immediately neighboured to the second arm and the contacting part is arranged between the first arm and the second arm.

7. The sealing device according to claim 2,
wherein the flap seal has a lower end facing towards the surface and an upper end facing away from the surface, wherein the contacting part contacts the flap seal in a middle between the lower end and the upper end.

8. The sealing device according to claim 7,
wherein the lower end and the upper end are parallel to each other.

9. The sealing device according to claim 7,
wherein the lower end and the upper end are parallel to the surface.

10. The sealing device according to claim 7,
wherein the sealing device is adapted such that the flap seal can tilt around the lower end.

11. The sealing device according to claim 1, further comprising:
a third protrusion that protrudes in a direction away from the surface, is arranged on a side of the flap seal and contacts the flap seal, wherein the side of the flap seal faces away from the first protrusion and the second protrusion.

12. The sealing device according to claim 1, further comprising:
a first bearing that is adapted to support the biasing means such that the biasing means can tilt with respect to the first protrusion, and
a second bearing that is adapted to support the biasing means such that the biasing means can tilt with respect to the second protrusion.

13. A flow machine, comprising:
the sealing device according to claim 1.

14. The flow machine according to claim 13,
wherein the surface is formed by a blade root of the flow machine.

* * * * *